United States Patent
Ishida et al.

(10) Patent No.: US 12,389,130 B2
(45) Date of Patent: Aug. 12, 2025

(54) CAMERA CONTROL DEVICE, CAMERA CONTROL METHOD, AND IMAGE CAPTURE DEVICE

(71) Applicant: Mitsubishi Electric Corporation, Tokyo (JP)

(72) Inventors: Kazuhiro Ishida, Tokyo (JP); Kazuki Kunihiro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 142 days.

(21) Appl. No.: 18/280,739

(22) PCT Filed: Apr. 23, 2021

(86) PCT No.: PCT/JP2021/016448
§ 371 (c)(1),
(2) Date: Sep. 7, 2023

(87) PCT Pub. No.: WO2022/224440
PCT Pub. Date: Oct. 27, 2022

(65) Prior Publication Data
US 2024/0305898 A1 Sep. 12, 2024

(51) Int. Cl.
*H04N 23/76* (2023.01)
*G03B 15/03* (2021.01)
*H04N 23/56* (2023.01)

(52) U.S. Cl.
CPC ............ *H04N 23/76* (2023.01); *G03B 15/03* (2013.01); *H04N 23/56* (2023.01)

(58) Field of Classification Search
None
See application file for complete search history.

(56) References Cited

U.S. PATENT DOCUMENTS

| 2004/0189837 | A1 | 9/2004 | Kido | |
| 2009/0109299 | A1* | 4/2009 | Nishiguchi | H04N 23/69 348/347 |
| 2017/0257541 | A1* | 9/2017 | Saito | G03B 15/05 |
| 2021/0120174 | A1* | 4/2021 | Fujimoto | H04N 23/10 |

FOREIGN PATENT DOCUMENTS

| JP | 2004-96328 A | 3/2004 |
| JP | 2004-304438 A | 10/2004 |
| JP | 2009-287918 A | 11/2009 |

OTHER PUBLICATIONS

International Search Report (PCT/ISA/210), issued in PCT/JP2021/016448, dated Jul. 27, 2021.

* cited by examiner

*Primary Examiner* — Stuart D Bennett
(74) *Attorney, Agent, or Firm* — Birch, Stewart, Kolasch & Birch, LLP (57) ABSTRACT

Disclosed is a camera control device configured in such a way as to include: a temperature detection signal acquisition unit to acquire a temperature detection signal indicating the temperature of an imaging element to output an image signal indicating an object from a temperature sensor to detect the temperature of the imaging element; and a control unit to control the amplification factor for the image signal to be outputted from the imaging element and the amount of light emitted by a light emitting element to apply light to the object on the basis of the temperature detection signal acquired by the temperature detection signal acquisition unit.

5 Claims, 7 Drawing Sheets

| Temperature | Amplification Factor | Emitted Light Amount |
|---|---|---|
| Less Than 60 Degrees | $G_{ref}$ | $L_{ref}$ |
| Greater Than or Equal to 60 Degrees and Less Than 70 Degrees | $G_{ref} \times 0.8$ | $L_{ref} \times 1.25$ |
| Greater Than or Equal to 70 Degrees and Less Than 80 Degrees | $G_{ref} \times 0.67$ | $L_{ref} \times 1.5$ |
| Greater Than or Equal to 80 Degrees | $G_{ref} \times 0.5$ | $L_{ref} \times 2$ |

| Temperature | Amplification Factor | Emitted Light Amount |
|---|---|---|
| Less Than 60 Degrees | $G_{ref}$ | $L_{ref}$ |
| Greater Than or Equal to 60 Degrees and Less Than 70 Degrees | $G_{ref} \times 0.8$ | $L_{ref} \times 1.25$ |
| Greater Than or Equal to 70 Degrees and Less Than 80 Degrees | $G_{ref} \times 0.67$ | $L_{ref} \times 1.5$ |
| Greater Than or Equal to 80 Degrees | $G_{ref} \times 0.5$ | $L_{ref} \times 2$ |

CAMERA CONTROL DEVICE, CAMERA CONTROL METHOD, AND IMAGE CAPTURE DEVICE

TECHNICAL FIELD

The present disclosure relates to a camera control device, a camera control method, and an image capture device.

BACKGROUND ART

There is an electronic camera provided with a charge coupled device (CCD) as an imaging element. White spot noise may be contained in an image signal outputted from a CCD, and the amount of the white spot noise contained in the image signal usually increases with increase in the temperature of the CCD.

As a technique of reducing the white spot noise contained in the image signal, there is an electronic camera disclosed in Patent Literature 1. In this electronic camera, when the temperature of the CCD is greater than or equal to a predetermined temperature, a control circuit performs control to decrease the amplification factor for the image signal to be outputted from the CCD, and control to increase the aperture value of the electronic camera.

CITATION LIST

Patent Literature

Patent Literature 1: JP 2004-96328 A

SUMMARY OF INVENTION

Technical Problem

In the electronic camera disclosed in Patent Literature 1, when the temperature of the CCD is greater than or equal to the predetermined temperature, the brightness of the image indicated by the image signal decreases because the control circuit performs the control to decrease the amplification factor for the image signal. Further, because the control circuit performs the control to increase the aperture value when the temperature of the CCD is greater than or equal to the predetermined temperature, the brightness of the image indicated by the image signal further decreases. Therefore, a problem with the electronic camera is that when the temperature of the CCD is greater than or equal to the predetermined temperature, the image indicated by the image signal becomes blurry.

The present disclosure is made in order to solve the above-mentioned problem, and it is therefore an object of the present disclosure to provide a camera control device and a camera control method capable of suppressing the decrease in the brightness of an image indicated by an image signal and reducing the white spot noise contained in the image signal.

Solution to Problem

A camera control device according to the present disclosure includes: temperature detection signal acquisition circuitry to acquire a temperature detection signal indicating the temperature of an imaging element to output an image signal indicating an object from a temperature sensor to detect the temperature of the imaging element; and control circuitry to control the amplification factor for the image signal to be outputted from the imaging element, the amount of light emitted by a light emitting element to apply light to the object, and the aperture value of a camera including the imaging element on the basis of the temperature detection signal acquired by the temperature detection signal acquisition circuitry. When the temperature indicated by the temperature detection signal acquired by the temperature detection signal acquisition circuitry is greater than or equal to a threshold, the control circuitry performs control to decrease the amplification factor for the image signal to be outputted from the imaging element to less than when the temperature indicated by the temperature detection signal is less than the threshold, control to increase the amount of light emitted by the light emitting element to greater than when the temperature indicated by the temperature detection signal is less than the threshold, and control to decrease the aperture value of the camera including the imaging element to less than when the temperature indicated by the temperature detection signal is less than the threshold.

Advantageous Effects of Invention

According to the present disclosure, the decrease in the brightness of the image indicated by the image signal can be suppressed and the white spot noise contained in the image signal can be reduced.

BRIEF DESCRIPTION OF DRAWINGS

FIG. 3 is a hardware configuration diagram of a computer in a case where the camera control device 14 is implemented by software, firmware, or the like;

DESCRIPTION OF EMBODIMENTS

Hereinafter, in order to explain the present disclosure in greater detail, embodiments of the present disclosure will be explained with reference to the accompanying drawings.

Embodiment 1

Figure 1:
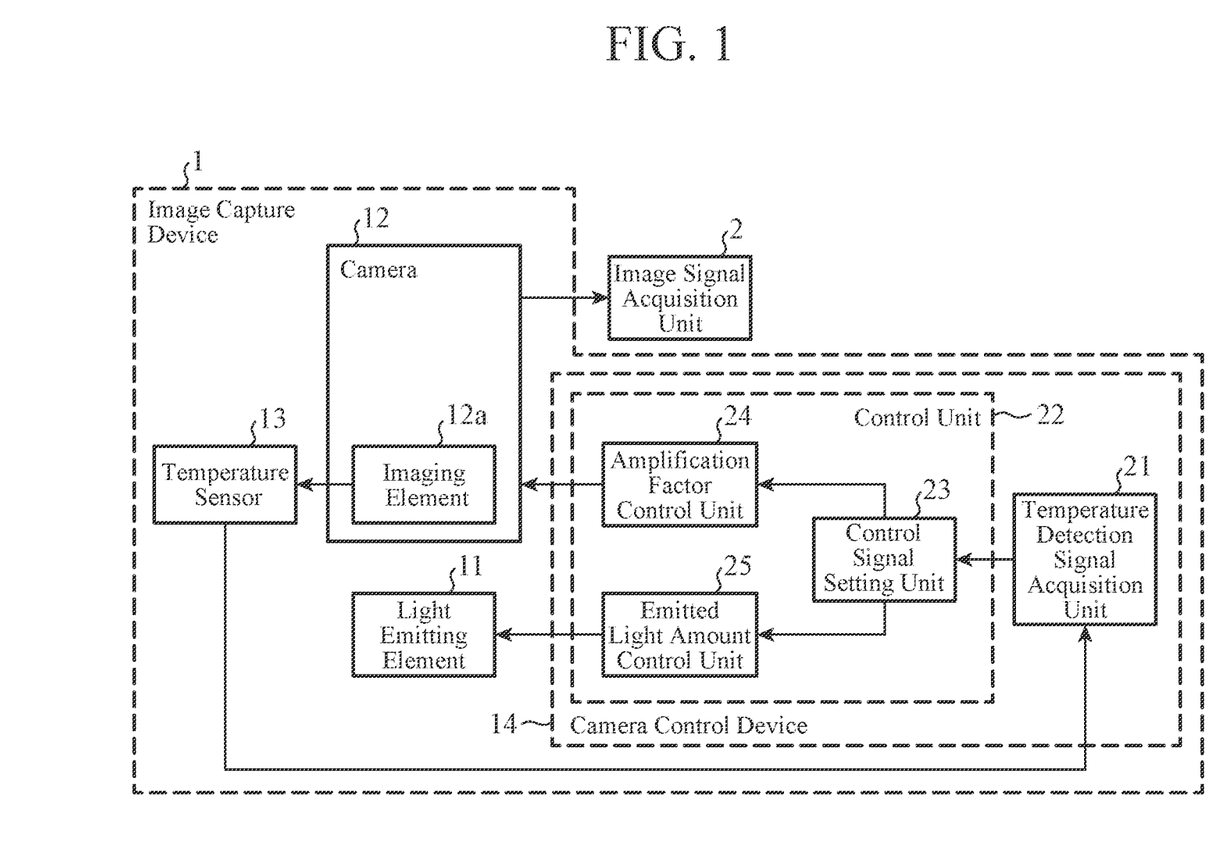
FIG. 1 is a configuration diagram showing a part of a driver monitoring system including an image capture device 1 according to Embodiment 1.

FIG. 1 is a configuration diagram showing a part of a driver monitoring system including an image capture device 1 according to Embodiment 1.

The driver monitoring system (DMS) shown in FIG. 1 includes the image capture device 1 and an image signal acquisition unit 2. The DMS performs image recognition processing on an occupant that is an object, the occupant being in a vehicle, and thereby detects the occupant's distracted driving or the like.

The image capture device 1 includes a light emitting element 11, a camera 12 including an imaging element 12a, a temperature sensor 13, and a camera control device 14.

The image capture device 1 captures an image of an object, to output an image signal indicating the object to the image signal acquisition unit 2.

The image signal acquisition unit 2 acquires the image signal outputted from the image capture device 1, and outputs the image signal to a not-illustrated image recognition processing unit that performs image recognition processing.

The image capture device 1 shown in FIG. 1 is mounted in a vehicle, and captures an image of an occupant in the vehicle. However, this is only an example, and the image capture device 1 may be mounted in a room or the like in a building, and capture an image of an object present in the room or the like.

The light emitting element 11 is implemented by, for example, an infrared-emitting diode that emits near infrared light.

The light emitting element 11 is mounted in an instrument panel, a dashboard, a rearview mirror, or the like of the vehicle. The light emitting element 11 applies near infrared light to an object.

In the image capture device 1 shown in FIG. 1, the light emitting element 11 applies near infrared light to an object. However, this is only an example, and the light emitting element 11 may apply visible light, far infrared light, or the like to an object.

The camera 12 is implemented by, for example, a near-infrared camera.

The camera 12 is mounted in the instrument panel, the dashboard, the rearview mirror, or the like of the vehicle.

The camera 12 includes the imaging element 12a, and captures an image of an object to which near infrared light is applied by the light emitting element 11.

The imaging element 12a is implemented by, for example, an image sensor.

The imaging element 12a outputs the image signal indicating the object to the image signal acquisition unit 2. White spot noise may be contained in the image signal outputted from the imaging element 12a, and the amount of the white spot noise contained in the image signal typically increases with increase in the temperature of the imaging element 12a.

In the image capture device 1 shown in FIG. 1, the camera 12 is implemented by a near-infrared camera. However, this is only an example. In the case where, for example, the light emitting element 11 is one that emits visible light, the camera 12 is implemented by a visible light camera, and, in the case where the light emitting element 11 is one that emits far infrared light, the camera 12 is implemented by a far-infrared camera.

The temperature sensor 13 detects the temperature Temp of the imaging element 12a, and outputs a temperature detection signal indicating the temperature Temp to the camera control device 14.

In the image capture device 1 shown in FIG. 1, the temperature sensor 13 detects the temperature of the imaging element 12a itself as the temperature Temp of the imaging element 12a. However, this is only an example, and the temperature sensor 13 may be configured in such a way as to detect the ambient temperature of the imaging element 12a as the temperature Temp of the imaging element 12a. More specifically, when the difference between the temperature of the imaging element 12a itself and the ambient temperature of the imaging element 12a is within the range of not causing any problem in practical applications, the temperature sensor 13 may output a temperature detection signal indicating the ambient temperature of the imaging element 12a to the camera control device 14. When the difference between the temperature of the imaging element 12a itself and the ambient temperature of the imaging element 12a is out of the range of not causing any problem in practical applications, the temperature sensor 13 may estimate the temperature of the imaging element 12a itself from the ambient temperature, and output a temperature detection signal indicating the estimated temperature to the camera control device 14.

Figure 2:
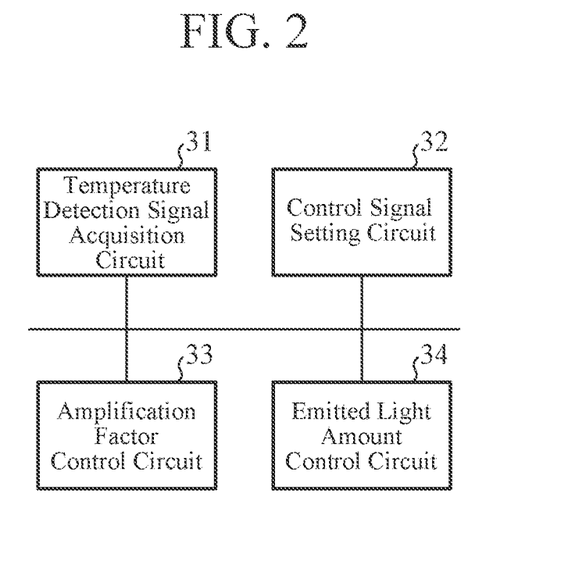
FIG. 2 is a hardware configuration diagram showing the hardware of a camera control device 14 according to Embodiment 1.

FIG. 2 is a hardware configuration diagram showing the hardware of the camera control device 14 according to Embodiment 1.

The camera control device 14 shown in FIG. 1 includes a temperature detection signal acquisition unit 21 and a control unit 22.

The temperature detection signal acquisition unit 21 is implemented by, for example, a temperature detection signal acquisition circuit 31 shown in FIG. 2.

The temperature detection signal acquisition unit 21 acquires the temperature detection signal outputted from the temperature sensor 13.

The temperature detection signal acquisition unit 21 outputs the temperature detection signal to the control unit 22.

The control unit 22 includes a control signal setting unit 23, an amplification factor control unit 24, and an emitted light amount control unit 25.

The control unit 22 controls the amplification factor G for the image signal to be outputted from the imaging element 12a and the amount L of light emitted by the light emitting element 11, on the basis of the temperature detection signal acquired by the temperature detection signal acquisition unit 21.

More specifically, when the temperature Temp indicated by the temperature detection signal acquired by the temperature detection signal acquisition unit 21 is greater than or equal to a threshold Th, the control unit 22 performs control to decrease the amplification factor G for the image signal to be outputted from the imaging element 12a to less than when the temperature Temp indicated by the temperature detection signal is less than the threshold Th, and control to increase the amount L of light emitted by the light emitting element 11 to greater than when the temperature Temp indicated by the temperature detection signal is less than the threshold Th. The threshold Th may be stored in an internal memory of the control unit 22 or may be provided from outside the camera control device 14.

The control signal setting unit 23 is implemented by, for example, a control signal setting circuit 32 shown in FIG. 2.

The control signal setting unit 23 sets up a first control signal C1 for controlling the amplification factor G for the image signal to be outputted from the imaging element 12a, on the basis of the temperature detection signal acquired by the temperature detection signal acquisition unit 21.

The control signal setting unit 23 sets up a second control signal C2 for controlling the amount L of light emitted by the light emitting element 11, on the basis of the temperature detection signal acquired by the temperature detection signal acquisition unit 21.

More specifically, the control signal setting unit 23 compares the temperature Temp indicated by the temperature detection signal acquired by the temperature detection signal acquisition unit 21 with the threshold Th.

When the temperature Temp is less than the threshold Th, the control signal setting unit 23 sets up a first control signal C1 indicating to set a reference amplification factor Gref as a target amplification factor. The reference amplification factor Gref is a preset reference of the amplification factor, and may be stored in an internal memory of the control signal setting unit 23 or may be provided from outside the camera control device 14.

When the temperature Temp is greater than or equal to the threshold Th, the control signal setting unit 23 sets up a first control signal C1 indicating to decrease the amplification factor G for the image signal to less than when the temperature Temp is less than the threshold Th. More specifically, when the temperature Temp is greater than or equal to the threshold Th, the control signal setting unit 23 sets up a first control signal C1 indicating to set an amplification factor less than the reference amplification factor Gref as the target amplification factor.

When the temperature Temp is less than the threshold Th, the control signal setting unit 23 further sets up a second control signal C2 indicating to set a reference emitted light amount $L_{ref}$ as a target emitted light amount. The reference emitted light amount $L_{ref}$ is a preset reference of the emitted light amount, and may be stored in the internal memory of the control signal setting unit 23 or may be provided from outside the camera control device 14.

When the temperature Temp is greater than or equal to the threshold Th, the control signal setting unit 23 sets up a second control signal C2 indicating to increase the amount L of light emitted by the light emitting element 11 to greater than when the temperature Temp is less than the threshold Th. More specifically, when the temperature Temp is greater than or equal to the threshold Th, the control signal setting unit 23 sets up a second control signal C2 indicating to set an emitted light amount greater than the reference emitted light amount $L_{ref}$ as the target emitted light amount.

The control signal setting unit 23 outputs the first control signal C1 to the amplification factor control unit 24, and outputs the second control signal C2 to the emitted light amount control unit 25.

The amplification factor control unit 24 is implemented by, for example, an amplification factor control circuit 33 shown in FIG. 2.

The amplification factor control unit 24 controls the amplification factor G for the image signal to be outputted from the imaging element 12a, in accordance with the first control signal C1 outputted from the control signal setting unit 23.

The emitted light amount control unit 25 is implemented by, for example, an emitted light amount control circuit 34 shown in FIG. 2.

The emitted light amount control unit 25 controls the amount L of light emitted by the light emitting element 11, in accordance with the second control signal C2 outputted from the control signal setting unit 23.

In FIG. 1, it is assumed that each of the following units: the temperature detection signal acquisition unit 21, the control signal setting unit 23, the amplification factor control unit 24, and the emitted light amount control unit 25, which are the components of the camera control device 14, is implemented by hardware for exclusive use as shown in FIG. 2. More specifically, it is assumed that the camera control device 14 is implemented by the temperature detection signal acquisition circuit 31, the control signal setting circuit 32, the amplification factor control circuit 33, and the emitted light amount control circuit 34.

Each of the following units: the temperature detection signal acquisition circuit 31, the control signal setting circuit 32, the amplification factor control circuit 33, and the emitted light amount control circuit 34 is, for example, a single circuit, a composite circuit, a programmable processor, a parallel programmable processor, an application specific integrated circuit (ASIC), a field-programmable gate array (FPGA), or a combination thereof.

The components of the camera control device 14 are not limited to ones each implemented by hardware for exclusive use, and the camera control device 14 may be implemented by software, firmware, or a combination of software and firmware.

The software or the firmware is stored as a program in a memory of a computer. The computer refers to hardware that executes a program, and is, for example, a central processing unit (CPU), a central processing device, a processing device, an arithmetic device, a microprocessor, a microcomputer, a processor, or a digital signal processor (DSP).

Figure 3:
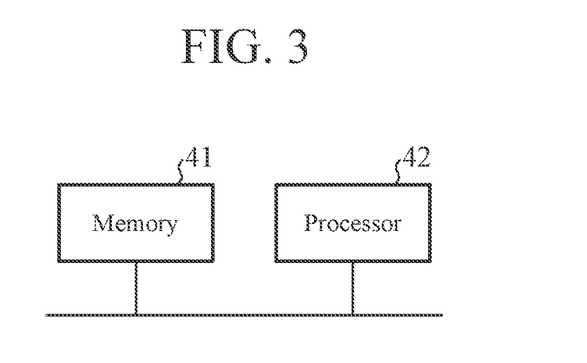

FIG. 3 is a hardware configuration diagram of a computer in the case where the camera control device 14 is implemented by software, firmware, or the like.

In the case where the camera control device 14 is implemented by software, firmware, or the like, a program for causing the computer to execute each of processing procedures performed in the temperature detection signal acquisition unit 21, the control signal setting unit 23, the amplification factor control unit 24, and the emitted light amount control unit 25 is stored in a memory 41. A processor 42 of the computer executes the program stored in the memory 41.

Further, in FIG. 2, an example in which each of the components of the camera control device 14 is implemented by hardware for exclusive use is shown, and in FIG. 3, an example in which the camera control device 14 is implemented by software, firmware, or the like is shown. However, this is only an example, and some components in the camera control device 14 may be implemented by hardware for exclusive use and the remaining components may be implemented by software, firmware, or the like.

Next, the operation of the driver monitoring system shown in FIG. 1 will be explained.

Figure 4:
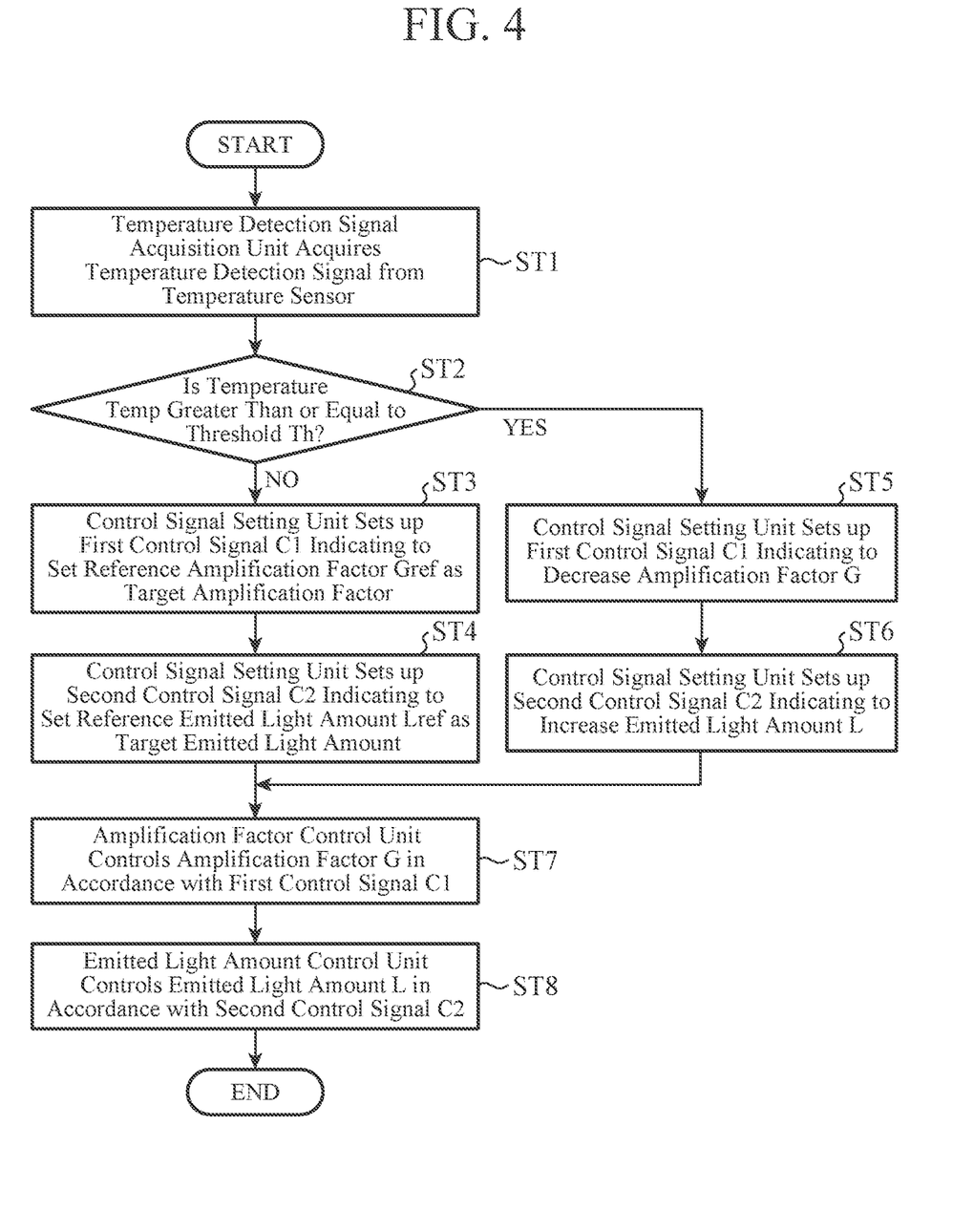
FIG. 4 is a flowchart showing a camera control method which is a processing procedure performed in the camera control device 14.

FIG. 4 is a flowchart showing a camera control method which is the processing procedure performed in the camera control device 14.

The light emitting element 11 applies near infrared light to an object.

The imaging element 12a included in the camera 12 outputs an image signal indicating the object to which the near infrared light is applied by the light emitting element 11 to the image signal acquisition unit 2.

The image signal acquisition unit 2 acquires the image signal from the imaging element 12a, and outputs the image signal to the image recognition processing unit not illustrated. Using the image signal, the image recognition processing unit performs image recognition processing, to detect distracted driving or the like of the occupant that is the object. Because the image recognition processing itself performed by the image recognition processing unit is a known technique, a detailed explanation is omitted. Because the process itself of detecting distracted driving or the like is a known technique, a detailed explanation is omitted.

The temperature sensor 13 detects the temperature Temp of the imaging element 12a.

The temperature sensor 13 outputs a temperature detection signal indicating the temperature Temp to the temperature detection signal acquisition unit 21 of the camera control device 14.

The temperature detection signal acquisition unit 21 acquires the temperature detection signal from the temperature sensor 13 (step ST1 of FIG. 4).

The temperature detection signal acquisition unit 21 outputs the temperature detection signal to the control signal setting unit 23 of the control unit 22.

The control signal setting unit 23 acquires the temperature detection signal from the temperature detection signal acquisition unit 21.

The control signal setting unit 23 compares the temperature Temp indicated by the temperature detection signal with the threshold Th. The threshold Th is set to, for example, a lower limit of temperatures at which white spot noise appears in the image signal. Concretely, the threshold Th is set to 60 degrees, 65 degrees, 70 degrees, or the like.

When the temperature Temp is less than the threshold Th (when No in step ST2 of FIG. 4), the control signal setting unit 23 sets up a first control signal C1 indicating to set the reference amplification factor $G_{ref}$ as the target amplification factor (step ST3 of FIG. 4).

When the temperature Temp is less than the threshold Th (when No in step ST2 of FIG. 4), the control signal setting unit 23 further sets up a second control signal C2 indicating to set the reference emitted light amount $L_{ref}$ as the target emitted light amount (step ST4 of FIG. 4).

When the temperature Temp is greater than or equal to the threshold Th (when Yes in step ST2 of FIG. 4), the control signal setting unit 23 sets up a first control signal C1 indicating to decrease the amplification factor G for the image signal to less than when the temperature Temp is less than the threshold Th (step ST5 of FIG. 4).

More specifically, the control signal setting unit 23 sets up a first control signal C1 indicating to set an amplification factor less than the reference amplification factor $G_{ref}$ as the target amplification factor. Concretely, the control signal setting unit 23 sets the target amplification factor to an amplification factor which is 0.8 times, 0.7 times, or some number of times as large as the reference amplification factor $G_{ref}$.

When the temperature Temp is greater than or equal to the threshold Th (when Yes in step ST2 of FIG. 4), the control signal setting unit 23 further sets up a second control signal C2 indicating to increase the amount L of light emitted by the light emitting element 11 to greater than when the temperature Temp is less than the threshold Th (step ST6 of FIG. 4).

More specifically, the control signal setting unit 23 sets up a second control signal C2 indicating to set an emitted light amount greater than the reference emitted light amount $L_{ref}$ as the target emitted light amount. Concretely, the control signal setting unit 23 sets the target emitted light amount to an emitted light amount which is 1.25 times, 1.5 times, or some number of times as large as the reference emitted light amount $L_{ref}$.

The control signal setting unit 23 outputs the first control signal C1 to the amplification factor control unit 24, and outputs the second control signal C2 to the emitted light amount control unit 25.

When receiving the first control signal C1 from the control signal setting unit 23, the amplification factor control unit 24 controls the amplification factor G for the image signal to be outputted from the imaging element 12a in accordance with the first control signal C1 (step ST7 of FIG. 4). More specifically, the amplification factor control unit 24 controls the amplification factor G for the image signal to be outputted from the imaging element 12a in such a way that the amplification factor G for the image signal matches the target amplification factor indicated by the first control signal C1.

When the temperature Temp is greater than or equal to the threshold Th, the amplification factor G for the image signal is decreased by the amplification factor control unit 24 to less than when the temperature Temp is less than the threshold Th. Thus, the white spot noise contained in the image signal is reduced even when the temperature Temp of the imaging element 12a becomes higher.

In the camera control device 14 shown in FIG. 1, the amplification factor control unit 24 controls the amplification factor G for the image signal to be outputted from the imaging element 12a, but does not perform control on the aperture value of the camera 12.

In the electronic camera disclosed in Patent Literature 1, when the temperature of the CCD is greater than or equal to the predetermined temperature, the control circuit performs control to not only decrease the amplification factor for the image signal, but also increase the aperture value. The control circuit performs the control to increase the aperture value, so that the white spot noise contained in the image signal is reduced. However, the control to increase the aperture value is auxiliary to the control to decrease the amplification factor, and thus only performing the control to decrease the amplification factor can sufficiently reduce the white spot noise contained in the image signal. Therefore, it is possible to sufficiently reduce the white spot noise without performing the control to increase the aperture value.

When receiving the second control signal C2 from the control signal setting unit 23, the emitted light amount control unit 25 controls the amount L of light emitted by the light emitting element 11 in accordance with the second control signal C2 (step ST8 of FIG. 4). More specifically, the emitted light amount control unit 25 controls the amount L of light emitted by the light emitting element 11 in such a way that the amount L of light emitted by the light emitting element 11 matches the target emitted light amount indicated by the second control signal C2.

When the temperature Temp is greater than or equal to the threshold Th, the amount L of light emitted by the light emitting element 11 is increased by the emitted light amount control unit 25 to greater than when the temperature Temp is less than the threshold Th. Thus, the decrease in the brightness of the image indicated by the image signal is suppressed, even when the temperature Temp of the imaging element 12a is high and hence the amplification factor G is decreased.

In above-mentioned Embodiment 1, the camera control device 14 is configured in such a way as to include: the temperature detection signal acquisition unit 21 to acquire a temperature detection signal indicating the temperature of the imaging element 12a to output an image signal indicating an object from the temperature sensor 13 to detect the temperature of the imaging element 12a; and the control unit 22 to control the amplification factor for the image signal to be outputted from the imaging element 12a and the amount of light emitted by the light emitting element 11 to apply light to the object on the basis of the temperature detection signal acquired by the temperature detection signal acquisition unit 21. Therefore, the camera control device 14 can suppress the decrease in the brightness of the image indicated by the image signal, and reduce the white spot noise contained in the image signal.

Embodiment 2

In Embodiment 2, a camera control device 14 that includes a table unit 26 to record a correspondence relationship among temperatures of an imaging element 12a, amplification factors for an image signal to be outputted from the imaging element 12a, and amounts of light emitted by a light emitting element 11 will be explained.

Figure 5:
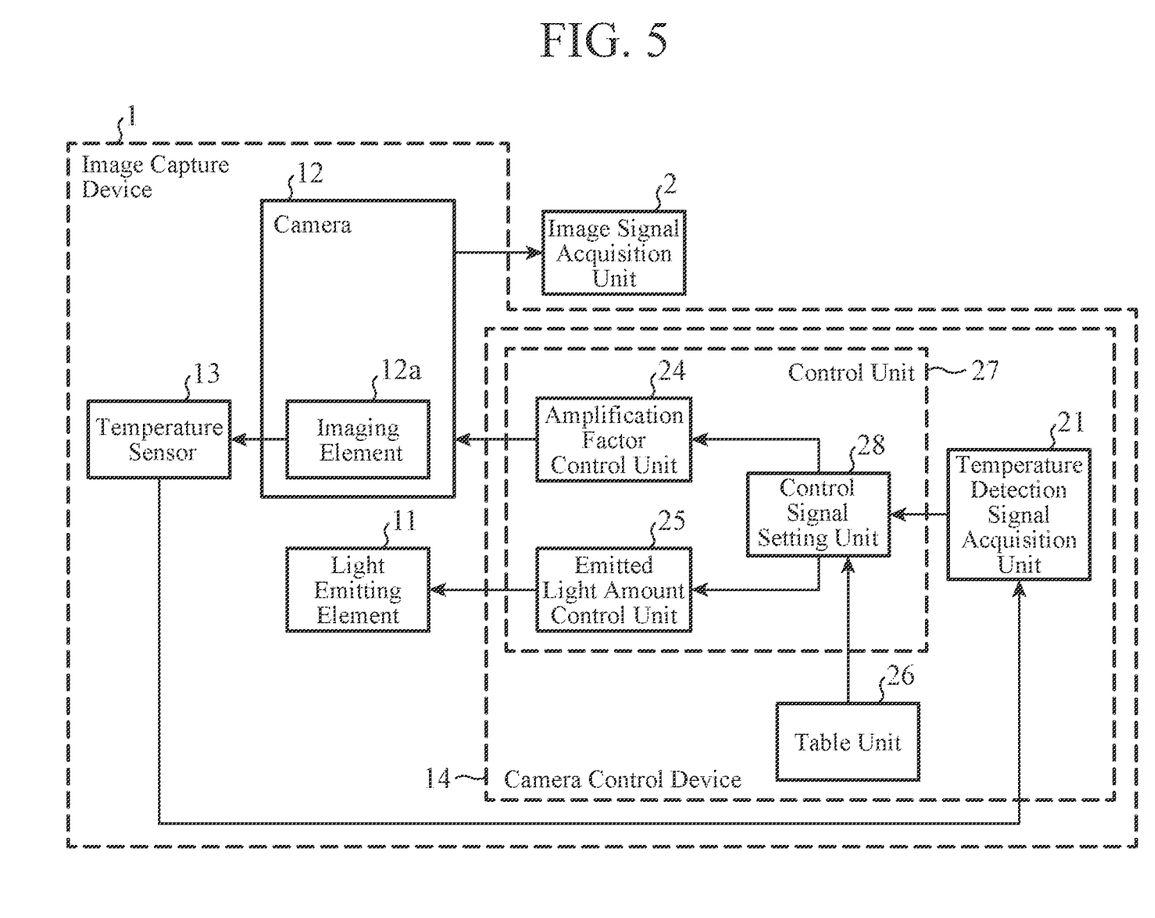
FIG. 5 is a configuration diagram showing a part of a driver monitoring system including an image capture device 1 according to Embodiment 2.

FIG. 5 is a configuration diagram showing a part of a driver monitoring system including an image capture device 1 according to Embodiment 2. In FIG. 5, because the same reference signs as those shown in FIG. 1 denote the same components or like components, an explanation of the components will be omitted hereinafter.

Figure 6:
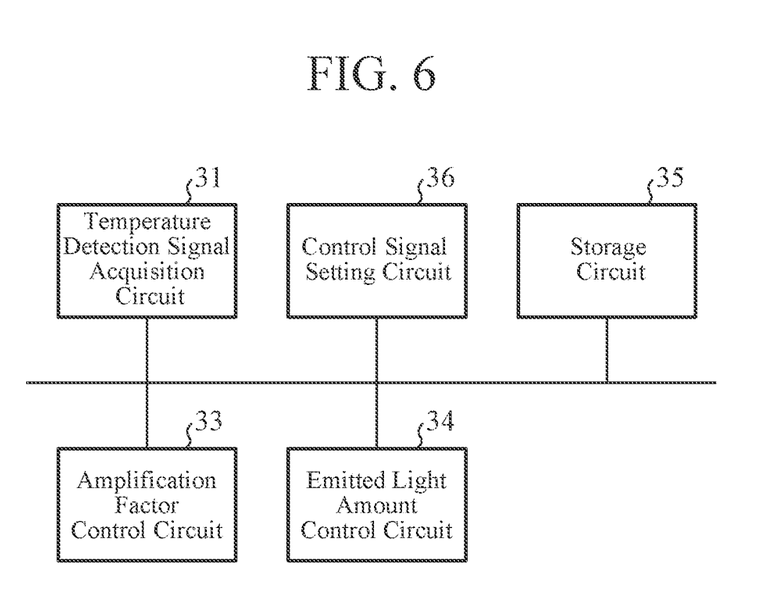
FIG. 6 is a hardware configuration diagram showing the hardware of a camera control device 14 according to Embodiment 2.

FIG. 6 is a hardware configuration diagram showing the hardware of the camera control device 14 according to Embodiment 2. In FIG. 6, because the same reference signs as those shown in FIG. 2 denote the same components or like components, an explanation of the components will be omitted hereinafter.

The camera control device 14 shown in FIG. 5 includes a temperature detection signal acquisition unit 21, the table unit 26, and a control unit 27.

The table unit 26 is implemented by, for example, a storage circuit 35 shown in FIG. 6.

The table unit 26 records the correspondence relationship among temperatures of the imaging element 12a, amplification factors for the image signal to be outputted from the imaging element 12a, and amounts of light emitted by the light emitting element 11.

Figure 7:
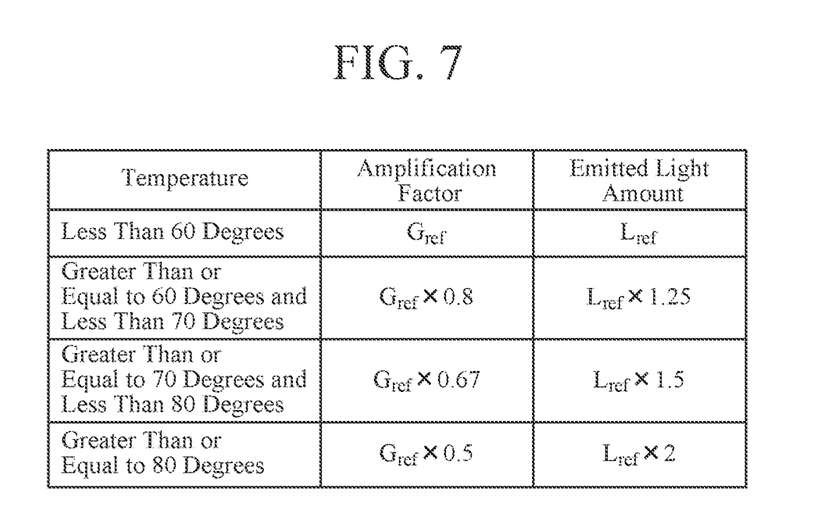
FIG. 7 is an explanatory drawing showing a correspondence relationship stored by a table unit 26.

FIG. 7 is an explanatory drawing showing the correspondence relationship stored by the table unit 26.

In the example of FIG. 7, the amplification factors for the image signal and the amounts of light emitted by the light emitting element 11 when the temperature of the imaging element 12a is less than 60 degrees, when the temperature of the imaging element 12a is greater than or equal to 60 degrees and less than 70 degrees, when the temperature of the imaging element 12a is greater than or equal to 70 degrees and less than 80 degrees, and when the temperature of the imaging element 12a is greater than or equal to 80 degrees are recorded in the table unit 26.

The control unit 27 includes a control signal setting unit 28, an amplification factor control unit 24, and an emitted light amount control unit 25.

The control signal setting unit 28 is implemented by, for example, a control signal setting circuit 36 shown in FIG. 6.

The control signal setting unit 28 acquires, from the table unit 26, the amplification factor $G_{Temp}$ and the emitted light amount $L_{Temp}$ which correspond to the temperature Temp indicated by a temperature detection signal acquired by the temperature detection signal acquisition unit 21.

The control signal setting unit 28 sets up a first control signal C1 indicating to set the acquired amplification factor $G_{Temp}$ as a target amplification factor, and sets up a second control signal C2 indicating to set the acquired emitted light amount $L_{Temp}$ as a target emitted light amount.

The control signal setting unit 28 outputs the first control signal C1 to the amplification factor control unit 24, and outputs the second control signal C2 to the emitted light amount control unit 25.

In FIG. 5, it is assumed that each of the following units: the temperature detection signal acquisition unit 21, the table unit 26, the control signal setting unit 28, the amplification factor control unit 24, and the emitted light amount control unit 25, which are the components of the camera control device 14, is implemented by hardware for exclusive use as shown in FIG. 6. More specifically, it is assumed that the camera control device 14 is implemented by a temperature detection signal acquisition circuit 31, the storage circuit 35, the control signal setting circuit 36, an amplification factor control circuit 33, and an emitted light amount control circuit 34.

Here, the storage circuit 35 is, for example, a non-volatile or volatile semiconductor memory, such as a random access memory (RAM), a read only memory (ROM), a flash memory, an erasable programmable read only memory (EPROM), or an electrically erasable programmable read only memory (EEPROM), a magnetic disc, a flexible disc, an optical disc, a compact disc, a mini disc, or a digital versatile disc (DVD).

Each of the following units: the temperature detection signal acquisition circuit 31, the control signal setting circuit 36, the amplification factor control circuit 33, and the emitted light amount control circuit 34 is, for example, a single circuit, a composite circuit, a programmable processor, a parallel programmable processor, an ASIC, an FPGA, or a combination thereof.

Each component of the camera control device 14 is not limited to the one implemented by hardware for exclusive use, and the camera control device 14 may be implemented by software, firmware, or a combination of software and firmware.

In the case where the camera control device 14 is implemented by software, firmware, or the like, the table unit 26 is formed on a memory 41 shown in FIG. 3. A program for causing a computer to execute each of processing procedures performed in the temperature detection signal acquisition unit 21, the control signal setting unit 28, the amplification factor control unit 24, and the emitted light amount control unit 25 is stored in the memory 41 shown in FIG. 3. A processor 42 shown in FIG. 3 executes the program stored in the memory 41.

Further, in FIG. 6, an example in which each of the components of the camera control device 14 is implemented by hardware for exclusive use is shown, and in FIG. 3, an example in which the camera control device 14 is implemented by software, firmware, or the like is shown. However, this is only an example, and some components in the camera control device 14 may be implemented by hardware for exclusive use and the remaining components may be implemented by software, firmware, or the like.

Next, the operation of the driver monitoring system shown in FIG. 5 will be explained. However, because the driver monitoring system is the same as the driver monitoring system shown in FIG. 1 except for the table unit 26 and the control unit 27, the operations of the table unit 26 and the control unit 27 will be mainly explained hereinafter.

The control signal setting unit 28 of the control unit 27 acquires, from the table unit 26, the amplification factor $G_{Temp}$ and the emitted light amount $L_{Temp}$ which correspond to the temperature Temp indicated by the temperature detection signal acquired by the temperature detection signal acquisition unit 21.

When the correspondence relationship stored by the table unit 26 is as shown in FIG. 7, and the temperature Temp indicated by the temperature detection signal is, for example, 50 degrees, the control signal setting unit 28 acquires a reference amplification factor $G_{ref}$ as the amplification factor $G_{Temp}$ Corresponding to the temperature Temp, and acquires a reference emitted light amount $L_{ref}$ as the emitted light 15 amount $L_{Temp}$ corresponding to the temperature Temp.

When the temperature Temp indicated by the temperature detection signal is, for example, 67 degrees, the control signal setting unit 28 acquires the reference amplification factor $G_{ref} \times 0.8$ as the amplification factor $G_{Temp}$ corresponding to the temperature Temp, and acquires the reference emitted light amount $L_{ref} \times 1.25$ as the emitted light amount $L_{Temp}$ corresponding to the temperature Temp.

When acquiring the amplification factor $G_{Temp}$ and the emitted light amount $L_{Temp}$, the control signal setting unit 28 sets up a first control signal C1 indicating to set the acquired amplification factor $G_{Temp}$ as the target amplification factor, and sets up a second control signal C2 indicating to set the acquired emitted light amount $L_{Temp}$ as the target emitted light amount.

The control signal setting unit 28 outputs the first control signal C1 to the amplification factor control unit 24, and outputs the second control signal C2 to the emitted light amount control unit 25.

When receiving the first control signal C1 from the control signal setting unit 28, the amplification factor control unit 24 controls the amplification factor G for the image signal to be outputted from the imaging element 12a in accordance with the first control signal C1.

Because the amplification factor G for the image signal is decreased by the amplification factor control unit 24 with increase in the temperature Temp, the white spot noise contained in the image signal is reduced even when the temperature Temp of the imaging element 12a becomes higher.

When receiving the second control signal C2 from the control signal setting unit 28, the emitted light amount control unit 25 controls the amount L of light emitted by the light emitting element 11 in accordance with the second control signal C2.

Because the amount of light emitted by the light emitting element 11 is increased by the emitted light amount control unit 25 with increase in the temperature Temp, the decrease in the brightness of the image indicated by the image signal is suppressed even when the temperature Temp of the imaging element 12a is high and hence the amplification factor G is decreased.

In above-mentioned Embodiment 2, the camera control device 14 shown in FIG. 5 is configured in such a way as to include the table unit 26 to record the correspondence relationship among temperatures of the imaging element 12a, amplification factors for the image signal to be outputted from the imaging element 12a, and amounts of light emitted by the light emitting element 11. Further, the control unit 27 of the camera control device 14 shown in FIG. 5 includes: the control signal setting unit 28 to acquire the amplification factor corresponding to the temperature indicated by the temperature detection signal acquired by the temperature detection signal acquisition unit 21 from the table unit 26 and set up a first control signal indicating to set the acquired amplification factor as the target amplification factor, and to acquire the emitted light amount corresponding to the temperature indicated by the temperature detection signal from the table unit 26 and set up a second control signal indicating to set the acquired emitted light amount as the target emitted light amount; the amplification factor control unit 24 to control the amplification factor for the image signal to be outputted from the imaging element 12a in accordance with the first control signal outputted from the control signal setting unit 28; and the emitted light amount control unit 25 to control the amount of light emitted by the light emitting element 11 in accordance with the second control signal outputted from the control signal setting unit 28. Therefore, the camera control device 14 shown in FIG. 5 can suppress the decrease in the brightness of the image indicated by the image signal and reduce the white spot noise contained in the image signal, like the camera control device 14 shown in FIG. 1.

In the camera control device 14 shown in FIG. 5, the control unit 27 acquires, from the table unit 26, the amplification factor $G_{Temp}$ and the emitted light amount $L_{Temp}$ which correspond to the temperature Temp indicated by the temperature detection signal acquired by the temperature detection signal acquisition unit 21. However, this is only an example, and the control unit 27 sets the amplification factor $G_{Temp}$ in such a way that it becomes smaller as the temperature Temp becomes higher, for example. Then, the control unit 27 may set the emitted light amount $L_{Temp}$ which makes $G_{Temp} \times L_{Temp}$ be equal to $G_{ref} \times L_{ref}$, as shown in the following equation (1), even when the amplification factor $G_{Temp}$ Changes with a change in the temperature Temp.

$$G_{Temp} \times L_{Temp} = G_{ref} \times L_{ref} \qquad (1)$$

Embodiment 3

In Embodiment 3, a camera control device 14 in which a control unit 51 includes an aperture value control unit 53 will be explained.

Figure 8:
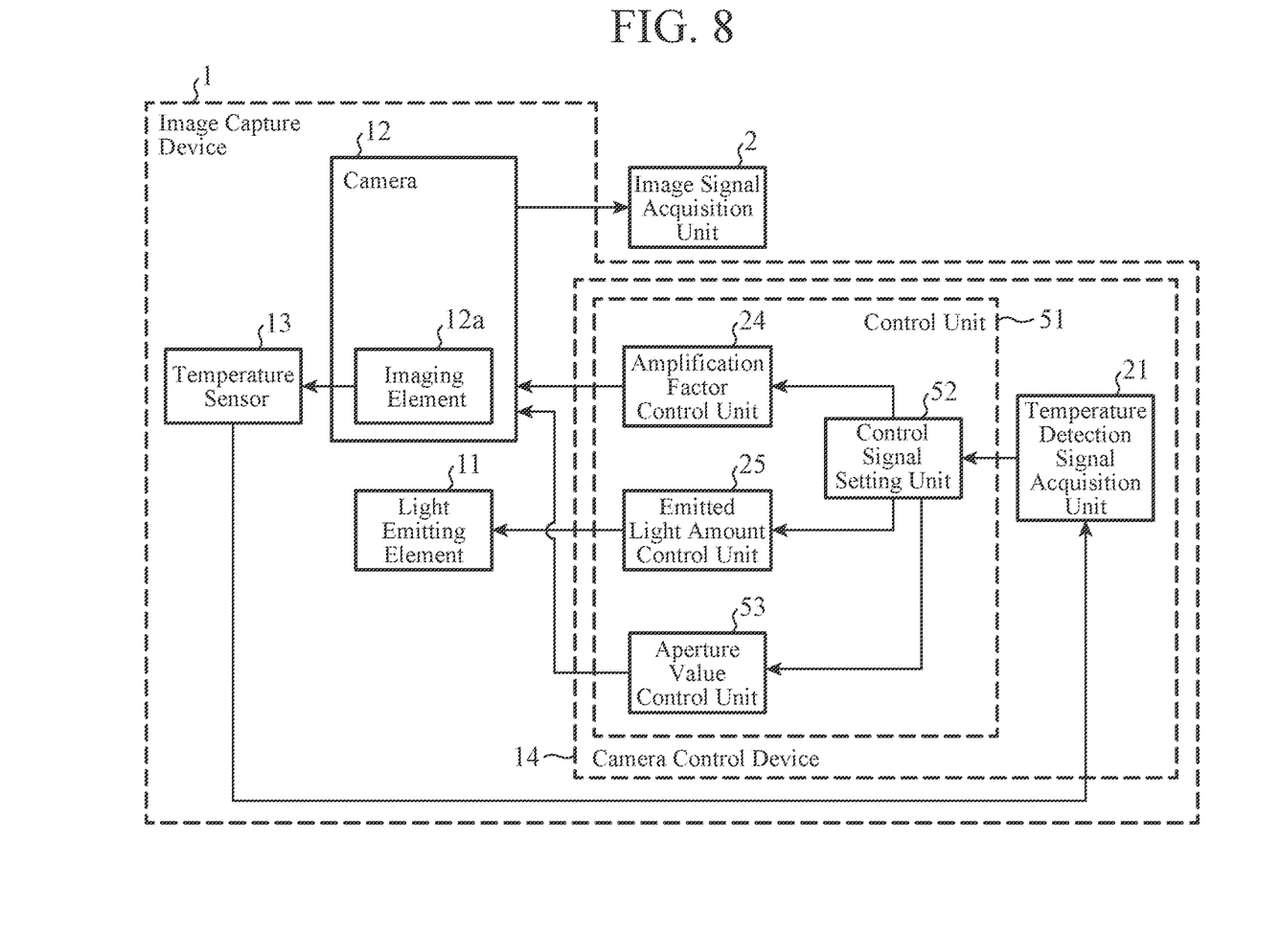
FIG. 8 is a configuration diagram showing a part of a driver monitoring system including an image capture device 1 according to Embodiment 3.

FIG. 8 is a configuration diagram showing a part of a driver monitoring system including an image capture device 1 according to Embodiment 3. In FIG. 8, because the same reference signs as those shown in FIGS. 1 and 5 denote the same components or like components, an explanation of the components will be omitted hereinafter.

Figure 9:
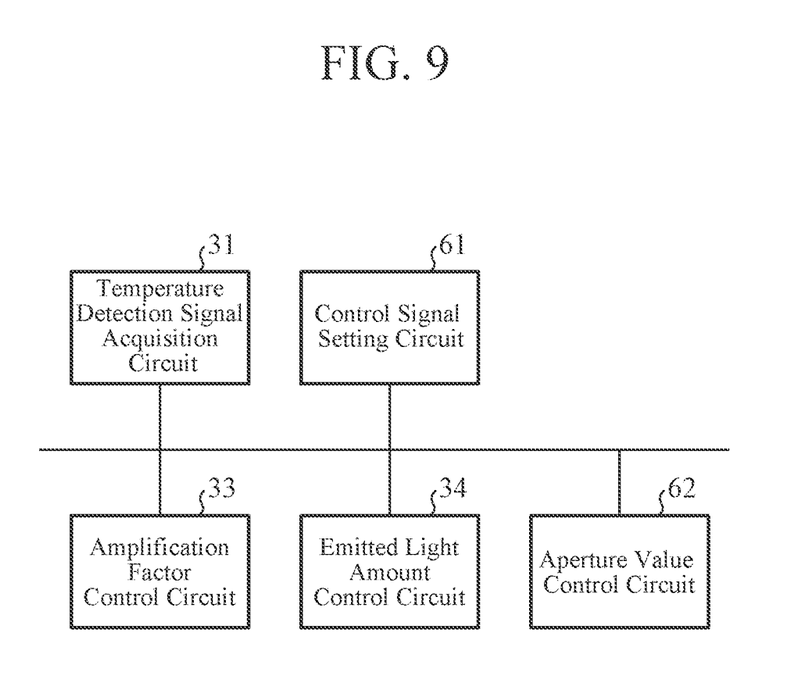
FIG. 9 is a hardware configuration diagram showing the hardware of a camera control device 14 according to Embodiment 3.

FIG. 9 is a hardware configuration diagram showing the hardware of the camera control device 14 according to Embodiment 3. In FIG. 9, because the same reference signs as those shown in FIGS. 2 and 6 denote the same components or like components, an explanation of the components will be omitted hereinafter.

The camera control device 14 shown in FIG. 8 includes a temperature detection signal acquisition unit 21 and the control unit 51.

The control unit 51 includes a control signal setting unit 52, an amplification factor control unit 24, an emitted light amount control unit 25, and the aperture value control unit 53.

The control unit 51 controls the amplification factor G for an image signal to be outputted from an imaging element 12a, the amount L of light emitted by a light emitting element 11, and the aperture value F of a camera 12, on the basis of a temperature detection signal acquired by the temperature detection signal acquisition unit 21.

The control signal setting unit 52 is implemented by, for example, a control signal setting circuit 61 shown in FIG. 9.

The control signal setting unit 52 compares the temperature Temp indicated by the temperature detection signal acquired by the temperature detection signal acquisition unit 21 with a threshold Th.

When the temperature Temp is less than the threshold Th, the control signal setting unit 52 sets up a first control signal C1 indicating to set a reference amplification factor $G_{ref}$ as a target amplification factor. When the temperature Temp is greater than or equal to the threshold Th, the control signal setting unit 52 sets up a first control signal C1 indicating to decrease the amplification factor G for the image signal to less than when the temperature Temp is less than the threshold Th. More specifically, when the temperature Temp is greater than or equal to the threshold Th, the control signal setting unit 52 sets up a first control signal C1 indicating to set an amplification factor less than the reference amplification factor $G_{ref}$ as the target amplification factor.

When the temperature Temp is less than the threshold Th, the control signal setting unit 52 sets up a second control signal C2 indicating to set a reference emitted light amount $L_{ref}$ as a target emitted light amount. When the temperature Temp is greater than or equal to the threshold Th, the control signal setting unit 52 sets up a second control signal C2 indicating to increase the amount L of light emitted by the light emitting element 11 to greater than when the temperature Temp is less than the threshold Th. More specifically, when the temperature Temp is greater than or equal to the threshold Th, the control signal setting unit 52 sets up a second control signal C2 indicating to set an emitted light amount greater than the reference emitted light amount $L_{ref}$ as the target emitted light amount.

When the temperature Temp is less than the threshold Th, the control signal setting unit 52 sets up a third control signal C3 indicating to set a reference aperture value $F_{ref}$ as a target aperture value. When the temperature Temp is greater than or equal to the threshold Th, the control signal setting unit 52 sets up a third control signal C3 indicating to decrease the aperture value F of the camera 12 to less than when the temperature Temp is less than the threshold Th. More specifically, when the temperature Temp is greater than or equal to the threshold Th, the control signal setting unit 52 sets up a third control signal C3 indicating to set an aperture value less than the reference aperture value $F_{ref}$ as the target aperture value. The reference aperture value $F_{ref}$ is a preset reference of the aperture value, and may be stored in an internal memory of the control signal setting unit 52 or may be provided from outside the camera control device 14.

The control signal setting unit 52 outputs the first control signal C1 to the amplification factor control unit 24, outputs the second control signal C2 to the emitted light amount control unit 25, and outputs the third control signal C3 to the aperture value control unit 53.

The aperture value control unit 53 is implemented by, for example, an aperture value control circuit 62 shown in FIG. 9.

The aperture value control unit 53 controls the aperture value F of the camera 12 in accordance with the third control signal C3 outputted from the control signal setting unit 52.

In FIG. 8, it is assumed that each of the following units: the temperature detection signal acquisition unit 21, the control signal setting unit 52, the amplification factor control unit 24, the emitted light amount control unit 25, and the aperture value control unit 53, which are the components of the camera control device 14, is implemented by hardware for exclusive use as shown in FIG. 9. More specifically, it is assumed that the camera control device 14 is implemented by the temperature detection signal acquisition circuit 31, the control signal setting circuit 61, the amplification factor control circuit 33, the emitted light amount control circuit 34, and the aperture value control circuit 62.

Each of the following units: the temperature detection signal acquisition circuit 31, the control signal setting circuit 61, the amplification factor control circuit 33, the emitted light amount control circuit 34, and the aperture value control circuit 62 is, for example, a single circuit, a composite circuit, a programmable processor, a parallel programmable processor, an ASIC, an FPGA, or a combination thereof.

The components of the camera control device 14 are not limited to ones each implemented by hardware for exclusive use, and the camera control device 14 may be implemented by software, firmware, or a combination of software and firmware.

In the case where the camera control device 14 is implemented by software, firmware, or the like, a program for causing a computer to execute each of processing procedures performed in the temperature detection signal acquisition unit 21, the control signal setting unit 52, the amplification factor control unit 24, the emitted light amount control unit 25, and the aperture value control unit 53 is stored in a memory 41 shown in FIG. 3. A processor 42 shown in FIG. 3 executes the program stored in the memory 41.

Further, in FIG. 9, an example in which each of the components of the camera control device 14 is implemented by hardware for exclusive use is shown, and in FIG. 3, an example in which the camera control device 14 is implemented by software, firmware, or the like is shown. However, this is only an example, and some components in the camera control device 14 may be implemented by hardware for exclusive use and the remaining components may be implemented by software, firmware, or the like.

Next, the operation of the driver monitoring system shown in FIG. 8 will be explained. However, because the driver monitoring system is the same as the driver monitoring system shown in FIG. 1 except for the control unit 51, the operation of the control unit 51 will be mainly explained hereinafter.

The control signal setting unit 52 of the control unit 51 acquires the temperature detection signal from the temperature detection signal acquisition unit 21.

The control signal setting unit 52 compares the temperature Temp indicated by the temperature detection signal with the threshold Th.

When the temperature Temp is less than the threshold Th, the control signal setting unit 52 sets up a first control signal C1 indicating to set the reference amplification factor $G_{ref}$ as the target amplification factor.

When the temperature Temp is less than the threshold Th, the control signal setting unit 52 sets up a second control signal C2 indicating to set the reference emitted light amount $L_{ref}$ as the target emitted light amount.

When the temperature Temp is less than the threshold Th, the control signal setting unit 52 further sets up a third control signal C3 indicating to set the reference aperture value $F_{ref}$ as the target aperture value.

When the temperature Temp is greater than or equal to the threshold Th, the control signal setting unit 52 sets up a first control signal C1 indicating to decrease the amplification factor G for the image signal to less than when the temperature Temp is less than the threshold Th.

More specifically, the control signal setting unit 52 sets up a first control signal C1 indicating to set an amplification factor less than the reference amplification factor $G_{ref}$ as the target amplification factor.

When the temperature Temp is greater than or equal to the threshold Th, the control signal setting unit 52 sets up a second control signal C2 indicating to increase the amount L of light emitted by the light emitting element 11 to greater than when the temperature Temp is less than the threshold Th.

More specifically, the control signal setting unit 52 sets up a second control signal C2 indicating to set an emitted light amount greater than the reference emitted light amount $L_{ref}$ as the target emitted light amount.

When the temperature Temp is greater than or equal to the threshold Th, the control signal setting unit 52 sets up a third control signal C3 indicating to decrease the aperture value F of the camera 12 to less than when the temperature Temp is less than the threshold Th.

More specifically, the control signal setting unit 52 sets up a third control signal C3 indicating to set an aperture value less than the reference aperture value $F_{ref}$ as the target aperture value.

The control signal setting unit 52 outputs the first control signal C1 to the amplification factor control unit 24, outputs the second control signal C2 to the emitted light amount control unit 25, and outputs the third control signal C3 to the aperture value control unit 53.

When receiving the first control signal C1 from the control signal setting unit 52, the amplification factor control unit 24 controls the amplification factor G for the image signal to be outputted from the imaging element 12a in accordance with the first control signal C1.

Because the amplification factor G for the image signal is decreased by the amplification factor control unit 24 with increase in the temperature Temp, the white spot noise contained in the image signal is reduced even when the temperature Temp of the imaging element 12a becomes higher.

When receiving the second control signal C2 from the control signal setting unit 52, the emitted light amount control unit 25 controls the amount L of light emitted by the light emitting element 11 in accordance with the second control signal C2.

Because the amount of light emitted by the light emitting element 11 is increased by the emitted light amount control unit 25 with increase in the temperature Temp, the decrease in the brightness of the image indicated by the image signal is suppressed even when the temperature Temp of the imaging element 12a is high and hence the amplification factor G is decreased.

When receiving the third control signal C3 from the control signal setting unit 52, the aperture value control unit 53 controls the aperture value F of the camera 12 in accordance with the third control signal C3. More specifically, the aperture value control unit 53 controls the aperture value F of the camera 12 in such a way that the aperture value F of the camera 12 matches the target aperture value indicated by the third control signal C3.

When the temperature Temp is greater than or equal to the threshold Th, the aperture value F of the camera 12 is decreased to less than when the temperature Temp is less than the threshold Th by the aperture value control unit 53. Thus, the decrease in the brightness of the image indicated by the image signal is suppressed even when the temperature Temp of the imaging element 12a is high and hence the amplification factor G is decreased. However, when the aperture value F of the camera 12 becomes small too much, the white spot noise contained in the image signal increases. Therefore, it is necessary to decrease the aperture value F in such a way that the increase in the white spot noise, the increase being caused by the decrease in the aperture value F, does not exceed the decrease in the white spot noise, the decrease being caused by the decrease in the amplification factor G.

In the camera control device 14 shown in FIG. 8, when the temperature Temp is greater than or equal to the threshold Th, not only is the amount L of light emitted by the light emitting element 11 increased, but also the aperture value F of the camera 12 is decreased. Therefore, compared to the camera control device 14 shown in FIG. 1, the camera control device 14 shown in FIG. 8 can suppress the decrease in the brightness of the image even when the increase in the amount L of light emitted by the light emitting element 11 is suppressed.

It is to be understood that any combination of two or more of the above-mentioned embodiments can be made, various changes can be made in any component according to any one of the above-mentioned embodiments, or any component according to any one of the above-mentioned embodiments can be omitted within the scope of the present disclosure.

INDUSTRIAL APPLICABILITY

The present disclosure is suitable for camera control devices, camera control methods, and image capture devices.

REFERENCE SIGNS LIST 1 image capture device, 2 image signal acquisition unit, 11 light emitting element, 12 camera, 12a imaging element, 13 temperature sensor, 14 camera control device, 21 temperature detection signal acquisition unit, 22 control unit, 23 control signal setting unit, 24 amplification factor control unit, 25 emitted light amount control unit, 26 table unit, 27 control unit, 28 control signal setting unit, 31 temperature detection signal acquisition circuit, 32 control signal setting circuit, 33 amplification factor control circuit, 34 emitted light amount control circuit, 35 storage circuit, 36 control signal setting circuit, 41 memory, 42 processor, 51 control unit, 52 control signal setting unit, 53 aperture value control unit, 61 control signal setting circuit, and 62 aperture value control circuit.

The invention claimed is:

1. A camera control device comprising:
   temperature detection signal acquisition circuitry to acquire a temperature detection signal indicating a temperature of an imaging element to output an image signal indicating an object from a temperature sensor to detect the temperature of the imaging element; and
   control circuitry to control an amplification factor for the image signal to be outputted from the imaging element, an amount of light emitted by a light emitting element to apply light to the object, and an aperture value of a camera including the imaging element on a basis of the temperature detection signal acquired by the temperature detection signal acquisition circuitry, wherein
   when the temperature indicated by the temperature detection signal acquired by the temperature detection signal acquisition circuitry is greater than or equal to a threshold, the control circuitry performs control to decrease the amplification factor for the image signal to be outputted from the imaging element to less than when the temperature indicated by the temperature detection signal is less than the threshold, control to increase the amount of light emitted by the light emitting element to greater than when the temperature indicated by the temperature detection signal is less than the threshold, and control to decrease the aperture value of the camera including the imaging element to less than when the temperature indicated by the temperature detection signal is less than the threshold.

2. The camera control device according to claim 1, wherein the control circuitry includes:
   control signal setting circuitry to, when the temperature indicated by the temperature detection signal acquired by the temperature detection signal acquisition circuitry is greater than or equal to the threshold, set up a first control signal indicating to decrease the amplification factor for the image signal to less than when the temperature indicated by the temperature detection signal is less than the threshold, set up a second control signal indicating to increase the amount of light emitted by the light emitting element to greater than when the temperature indicated by the temperature detection signal is less than the threshold, and set up a third control signal indicating to decrease the aperture value of the camera to less than when the temperature indicated by the temperature detection signal is less than the threshold;

amplification factor control circuitry to control the amplification factor for the image signal to be outputted from the imaging element in accordance with the first control signal outputted from the control signal setting circuitry;

emitted light amount control circuitry to control the amount of light emitted by the light emitting element in accordance with the second control signal outputted from the control signal setting circuitry; and aperture value control circuitry to control the aperture value of the camera in accordance with the third control signal outputted from the control signal setting circuitry.

3. A camera control method comprising:

acquiring a temperature detection signal indicating a temperature of an imaging element to output an image signal indicating an object from a temperature sensor to detect the temperature of the imaging element;

controlling an amplification factor for the image signal to be outputted from the imaging element, an amount of light emitted by a light emitting element to apply light to the object, and an aperture value of a camera including the imaging element on a basis of the acquired temperature detection signal; and when the temperature indicated by the acquired temperature detection signal is greater than or equal to a threshold, performing control to decrease the amplification factor for the image signal to be outputted from the imaging element to less than when the temperature indicated by the temperature detection signal is less than the threshold, control to increase the amount of light emitted by the light emitting element to greater than when the temperature indicated by the temperature detection signal is less than the threshold, and control to decrease the aperture value of the camera including the imaging element to less than when the temperature indicated by the temperature detection signal is less than the threshold.

4. An image capture device comprising:

a light emitting element to apply light to an object;

an imaging element to output an image signal indicating the object;

a temperature sensor to detect a temperature of the imaging element and output a temperature detection signal indicating the temperature; and the camera control device according to claim 1.

5. A camera control device comprising:

temperature detection signal acquisition circuitry to acquire a temperature detection signal indicating a temperature of an imaging element to output an image signal indicating an object from a temperature sensor to detect the temperature of the imaging element; and control circuitry to control an amplification factor for the image signal to be outputted from the imaging element and an amount of light emitted by a light emitting element to apply light to the object on a basis of the temperature detection signal acquired by the temperature detection signal acquisition circuitry, wherein the control circuitry sets, in a variable manner, the amplification factor for the image signal depending on the temperature indicated by the temperature detection signal acquired by the temperature detection signal acquisition circuitry, and the control circuitry sets the amount of light emitted by the light emitting element so that a product of the set amplification factor for the image signal and the set amount of light emitted by the light emitting element equals a product of a preset reference amplification factor and a preset reference emitted light amount.

* * * * *